United States Patent [19]

Cluzel

[11] Patent Number: 5,996,662
[45] Date of Patent: Dec. 7, 1999

[54] TIRE HAVING CROWN REINFORCEMENT

[75] Inventor: Guy Cluzel, Beaumont, France

[73] Assignee: Compagnie Générale des Etablissements Michelin—Michelin & Cie, Clermont-Ferrand, France

[21] Appl. No.: 09/077,857

[22] PCT Filed: Oct. 13, 1997

[86] PCT No.: PCT/EP97/05625

§ 371 Date: Jun. 4, 1998

§ 102(e) Date: Jun. 4, 1998

[87] PCT Pub. No.: WO98/17485

PCT Pub. Date: Apr. 30, 1998

[30] Foreign Application Priority Data

Oct. 23, 1996 [FR] France .................................. 96 13021

[51] Int. Cl.$^6$ ................................ B60C 9/18; B60C 9/22
[52] U.S. Cl. ...................... 152/531; 152/532; 152/534; 152/535; 152/537; 152/538
[58] Field of Search ............................. 152/209.1, 209.5, 152/209.16, 526, 531, 532, 534, 535, 536, 537, 538

[56] References Cited

U.S. PATENT DOCUMENTS

| | | |
|---|---|---|
| 4,262,726 | 4/1981 | Welter . |
| 4,425,953 | 1/1984 | Rohde et al. ............................ 152/532 |
| 4,671,333 | 6/1987 | Rohde et al. . |
| 4,702,293 | 10/1987 | Iwata et al. .............................. 152/531 |
| 4,962,802 | 10/1990 | Rohde . |

FOREIGN PATENT DOCUMENTS

| | | |
|---|---|---|
| 0173101 | 3/1986 | European Pat. Off. . |
| 0192910 | 9/1986 | European Pat. Off. . |
| 0326123 | 8/1989 | European Pat. Off. . |
| 1290231 | 12/1962 | France . |
| 2222232 | 10/1974 | France . |
| 2419185 | 11/1979 | France . |
| 2566334 | 12/1985 | France . |
| 4-183606 | 6/1992 | Japan ..................................... 152/532 |

OTHER PUBLICATIONS

Abstract for FR 2,222,232

Primary Examiner—Steven D. Maki
Attorney, Agent, or Firm—Baker & Botts, L.L.P.

[57] ABSTRACT

A radial "heavy vehicle" tire, of H/S form ratio of at most 0.60, with a crown reinforcement (2) composed of at least two crossed working plies (21, 22), and at least one ply (20) of circumferential cables arranged above the carcass ply (1) and a tread (10) of width L, characterized in that there is arranged, between the ply of circumferential cables (20) and the first, radially innermost, working ply (21), a layer of rubber mix (4) of low modulus of extension, of constant thickness of between 2 and 3 mm. and having a width LM equal to L21, while the second, radially outermost, working ply (22), of axial width L22, which is greater than the width L21, is separated radially from the edge of the ply of circumferential cables (20), firstly by a rubber cushion (5) of a high modulus of extension, extending axially from the end of the working ply (21) beyond the end of the ply of circumferential cables (20), and secondly, radially on the outside of said cushion (5), by a wedge of rubber (6) of a modulus which is intermediate the low modulus and the high modulus and extends axially substantially from the edge of the radially outer working ply (22) to a point axially on the inside of the end of the working ply (21).

2 Claims, 2 Drawing Sheets

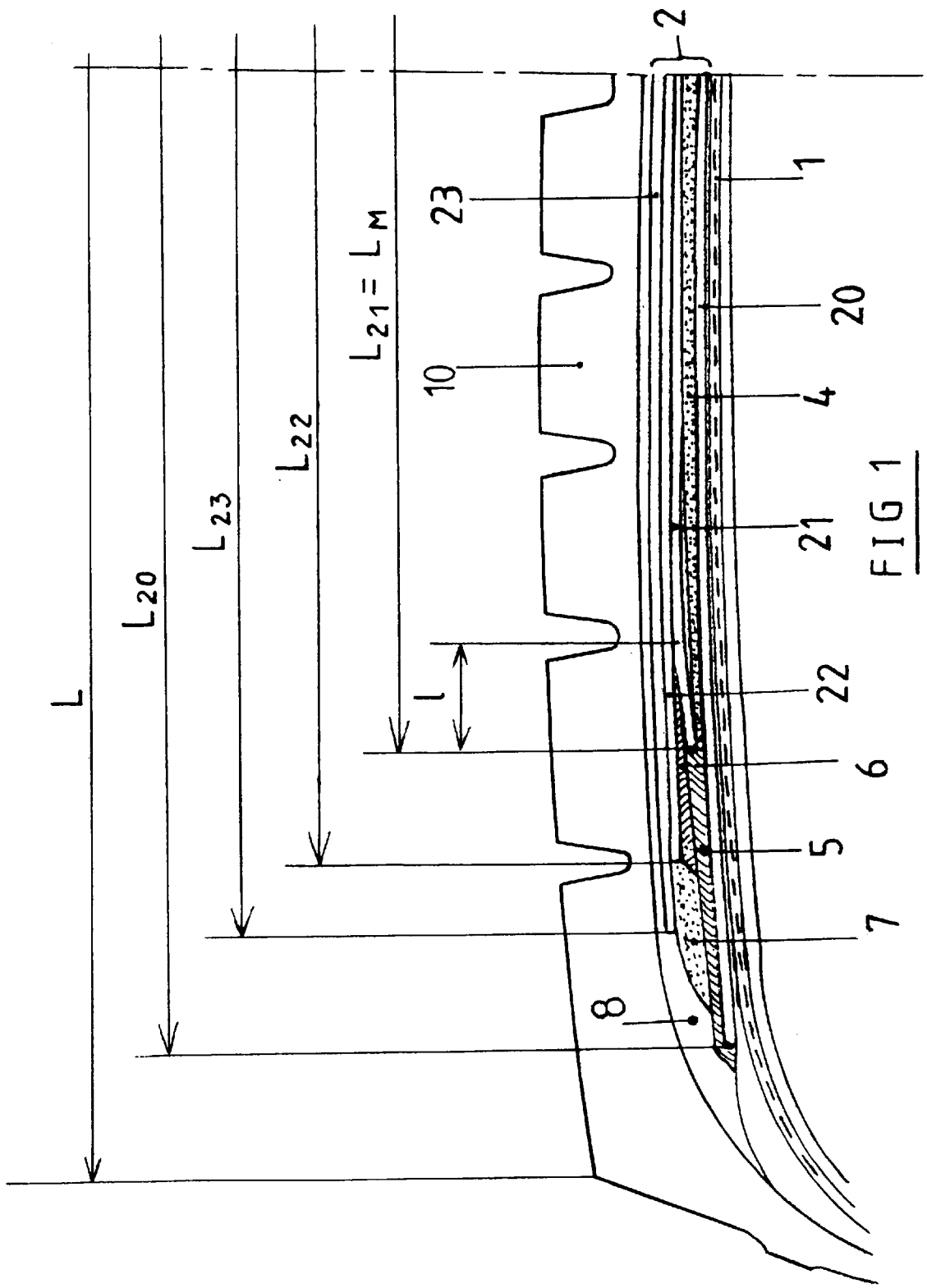

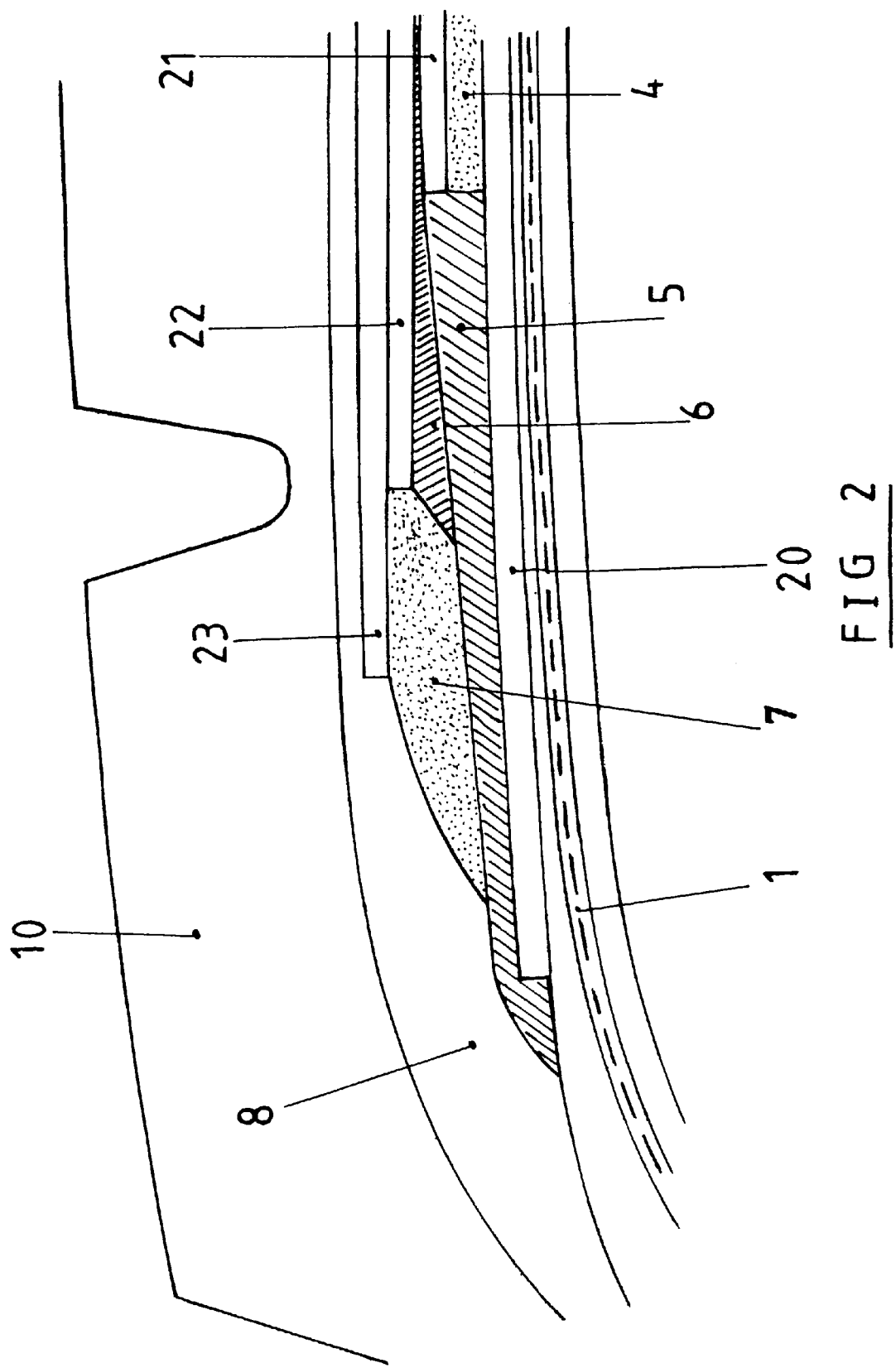

TIRE HAVING CROWN REINFORCEMENT

BACKGROUND OF THE INVENTION

The present invention relates to a tire with radial carcass reinforcement of low H/S form ratio, which tire is particularly intended to be fitted on a heavy road vehicle.

Such a so-called "heavy vehicle" tire comprises a radial carcass reinforcement, generally formed by a single ply of radial metal cables preferably made of steel, said ply being anchored in each bead to at least one bead wire, which itself is made of metal, having a composition and a shape matched to the inclination of the bead seat, in order to form an upturn. The skeleton of the tire is completed by a crown reinforcement which hoops the carcass reinforcement. Said crown reinforcement is generally composed, radially from the carcass reinforcement to the outside, of a ply or two halfplies called triangulation plies, two plies called working crown plies and one or two plies called protective plies. The triangulation halfply or plies, the object of which is to prevent the subjacent cables of the carcass reinforcement becoming compressed, are formed of inextensible metal cables, forming a large angle, possibly being between 50° and 90°, with the circumferential direction. The working crown plies are formed of inextensible metal cables, crossed from one ply to the next, forming with the circumferential direction angles, which may be equal or not equal, which are generally small, of between 15° and 35°. As for the protective plies, they are formed of elastic cables which form with the circumferential direction angles o f a value similar to that of the angles of the cables of the working plies.

Such a crown reinforcement structure is very widely used in the "heavy vehicle" tires of H/S form ratio ≧0.8, and is completely satisfactory. On the other hand, for many reasons it is difficult to apply to tires of H/S form ratio <0.60.

In order to solve one of the problems set, namely controlling the meridian profile of the tread, it has been proposed, for example in French Patent 2 566 334, to replace the triangulation ply (plies) with a ply of inextensible circumferential or quasi-circumferential cables, the axial ends of which are axially on the outside of the ends of the two plies of crossed cables, which complete the crown reinforcement of the tire described in the afore-mentioned patent.

For the same reasons as previously, French Patent 2 419 185 recommends the use of two hooping reinforcements located on either side of the equatorial plane, each reinforcement being composed of two plies of low width and of inextensible metal cables crossed from one ply to the other, forming a preferably small angle of 5° to 0° with the circumferential direction.

Although such crown reinforcement structures have the advantage of greatly reducing the risk of separation between the ends of the working plies, at the same time as they make it possible to avoid the formation upon inflation of the concave shape of the tread, on the other hand they are not sufficiently effective for overcoming a specific problem of the dimensions of the tire in question, namely the risks of the cables of the carcass ply becoming compressed, a ply of circumferential cables not being at all effective in solving such a problem.

It is possible to overcome the above disadvantages by various means, for example by redimensioning the cables of the carcass ply so as to make them more resistant to fatigue by compression. Another means consists in controlling the transverse contraction of the crown reinforcement. The current known means, generally consisting in increasing the metallic mass of the reinforcements, result in an increase in the cost of the tire.

SUMMARY OF THE INVENTION

In order to overcome the above disadvantages, the tire of H/S form ratio of <0.60, according to the invention, and principally comprising a carcass reinforcement composed of at least one ply of radial cables, a crown reinforcement composed of at least two so-called working plies of inextensible metal cables crossed from one ply to the next, forming angles of between 15° and 35° with the circumferential direction, and at least one ply of circumferential cables arranged between the outermost ply of radial cables and the first, radially innermost, working crown ply, said ply of circumferential cables having ends axially beyond the ends of the working plies and said crown reinforcement being surmounted by a tread of width L, characterized in that there is arranged between the ply of circumferential cables, of a width L20 of between 0.8 and 0.95 L, and the first, radially innermost, working ply, of a width L21 of between 0.5 and 0.7 L, a layer of rubber mix of low modulus of extension, of constant thickness of between 2 and 3 mm and having a width LM equal to L21, whilst the second, radially outermost, working ply, of axial width L22, which is greater than the width L21, is separated radially from the edge of the ply of circumferential cables, firstly by a rubber cushion of a high modulus of extension, extending axially from the end of the first working ply beyond the end of the ply of circumferential cables, of a thickness practically equal to the total thickness of the first working ply and of the layer of rubber of low modulus, and secondly, radially on the outside of said cushion, by a wedge of rubber of a modulus which is intermediate between the low modulus and the high modulus and extends axially substantially from the edge of the second working ply to a point axially on the inside of the end of the first working ply by a quantity of between 0.03 and 0.10 times the width L21, said wedge permitting the uncoupling of the edges of the working plies.

"Rubber mix, obviously vulcanized, of low modulus of extension" is to be understood to mean a mix, the secant modulus of which at 10% relative elongation is between 3.3 and 3.7 MPa. A mixture of a high modulus of extension will have a modulus, measured under the same conditions, of between 10 and 20 MPa, whereas a mix of a modulus intermediate between the two preceding ones will have a modulus, of the same name and measured under the same conditions, of between 6 and 9 MPa.

The combination of the widths, respectively of the ply of circumferential cables and of the working crown plies, with the arrangement optimized in quality and location of the layers of rubber between the different plies mentioned makes it possible not only to avoid the risks of the cables of the normally designed carcass ply becoming compressed, but also to improve the resistance to separation between the edges of the working plies, owing to the blocking under transverse stress of the complex formed by the ply of circumferential cables, the layer of rubber radially on top and the first working ply, whereas the edges of said working plies are separated by rubber having a conventional modulus of extension, contrary to a certain teaching (see French Patent 1 290 231) recommending the separation of such edges by a wedge of rubber of great hardness.

The separation between working plies may, within the scope of the invention, be improved firstly by the presence, radially above the second, radially outermost, working ply, of a ply of elastic cables oriented in the same direction as that of the cables of the subjacent second working ply, but of axial width L23 greater than L22 and less than L20. Said protective ply is then advantageously separated from the complex described above by a wedge of rubber mix of low modulus of extension, identical to the modulus of the rubber layer located between the ply of circumferential cables and the first working ply.

DESCRIPTION OF THE DRAWING

The characteristics and advantages of the present invention will be better understood with reference to the following description, which refers to the drawing illustrating an example of embodiment in non-limitative manner, in which drawing:

FIG. 1 is a diagram of a meridian section through the upper part of a tire according to the invention, FIG. 2 is an enlargement of the circled part of FIG. 1.

DESCRIPTION OF PREFERRED EMBODIMENTS

The tire according to the invention, of dimension 495/45-22.5 has an H/S shape ratio substantially equal to 0.45, H being the height of the tire upon rim and S being the maximum axial width of said tire mounted on its operating rim 22.5×17.00 and inflated to a recommended pressure of 9 bar.

Said tire mainly comprises a carcass reinforcement formed, in the case described, of a single ply 1 of metal cables made of steel, capable of resisting a tensile force which is very clearly greater than the tensile force generated by the inflation pressure of the tire. This carcass reinforcement 1, isolated from the inflation gas by the inner layers of rubber, as is known per se, is surmounted radially on the outside by a crown reinforcement 2. Said crown reinforcement 2 is formed, passing radially from the inside to the outside, by a ply 20 called hooping crown ply, formed of metal cables made of steel, the modulus of which makes it possible to impart to said ply 20 a stiffness in extension per unit of width of between 3300 and 9000 daN/mm (the stiffness in extension is the ratio of the extension force applied to the unit of width of the ply in order to obtain a given elongation in the direction of the circumferential cables). The ply 20 has a width L20 of 380 mm, namely 0.90 times the width L of the tread 10 of the tire. It is separated radially on the outside from the first working ply 21 by a layer of rubber mix 4. The ply 21 is formed of inextensible metal cables made of steel, which enables it to have a stiffness in extension per unit of width, perpendicular to the direction of the cables, of between 5500 and 8000 daN/mm, and forming an angle of 18° D with the circumferential direction. The ply 21 has a width L21 of 260 mm, namely 0.6 times the width L of the tread 10. The layer of rubber mix 4 has a width LM which is exactly equal to the width L21, has a thickness e which is constant over said width and equal to 2.5 mm and has a modulus of extension at 10% relative elongation of 3.5 MPa.

Axially on the outside of the ends of the first working ply 21 and of the layer 4, there is arranged on the ply 20 of circumferential cables a cushion 5 of rubber mix which may have a constant thickness or one decreasing with increasing distance from the above ends, and a width such that said cushion covers the end of the ply 20. Said cushion 5 has a high modulus of extension, equal to 12 MPa.

The first working crown ply 21 is surmounted radially on the outside by a second working ply 22, formed by the same metal cables made of steel as those of the working ply 21, and consequently having the same stiffness in extension per unit of width, said cables forming an angle of 18° G with the circumferential direction. The width L22 of the second, radially outermost, working ply 22 is greater than the width L21 of 50 mm. which is why there is an axial distance of 25 mm between each end of the first ply 21 and each end of the second ply 22.

Between the first working ply 21 and the second working ply 22 there is a triangular wedge of rubber mix 6 arranged such that it is inserted between the edges of said working plies over an axial width 1 corresponding to 6% of the width L21 of the first, shortest, working ply 21 and such that it covers the cushion 5 of rubber of high modulus over the axial distance between the ends of the first working ply 21 and the second working ply 22 respectively. Said rubber wedge 6 has a modulus of extension of 7.5 MPa.

The so-called protective ply 23 completes the crown reinforcement. Composed of so-called elastic metal cables, that is to say ones having a relative elongation of at least 2% under a force equal to 10% of the breaking load, forming with the circumferential direction an angle equal to the angle formed by the cables of the second working ply 22, the ply 23 has a width of 335 mm, that is to say greater than L22 but less than L20. It is separated from the rubber cushion 5 by a second wedge 7 of rubber mix having a modulus of extension equal to the modulus of the layer 4 separating the ply 20 of circumferential cables from the first, radially innermost, working ply 21. In order to reduce the heating-up of the tire as much as possible, the crown reinforcement 2 is covered over with a layer 8 of rubber mix of low hysteresis, that is to say, a hysteresis equal to half the hysteresis of the tread. Said layer 8 is itself surmounted radially by the tread 10.

I claim:

1. A tire comprising a carcass reinforcement composed of at least one ply (1) of radial cables, a crown reinforcement (2) composed of at least two working plies (21, 22) of crossed inextensible metal cables, the at least two working plies (21, 22) including a first, radially innermost, working ply (21) and a second, radially outermost, working ply (22), and at least one ply (20) of circumferential cables arranged between the carcass reinforcement and the first, radially innermost, working ply (21), said at least one ply of circumferential cables (20) having ends axially beyond the ends of the working plies (21, 22) and said crown reinforcement (2) being surmounted by a tread (10) of width L, characterized in that there is arranged between the at least one ply of circumferential cables (20), which has a width L20 of between 0.8 and 0.95 L, and the first, radially innermost, working ply (21), which has a width L21 of between 0.5 and 0.7 L, a layer of rubber mix (4) of low modulus of extension, the layer of rubber mix (4) of low modulus extension having constant thickness of between 2 and 3 mm and having a width LM equal to the width L21, the second, radially outermost, working ply (22), which has an axial width L22 which is greater than the width L21, is separated radially from an edge of the at least one ply of circumferential cables (20), firstly by a rubber cushion (5) of a high modulus of extension, extending axially from the end of the first working ply (21) beyond the end of the at least one ply of circumferential cables (20) and having a thickness practically equal to the total thickness of the first working ply (21) and of the layer of rubber mix (4) of low modulus of extension, and secondly, radially on the outside of said cushion (5), by a wedge of rubber (6) of a modulus which is intermediate between the low modulus and the high modulus, the wedge of rubber (6) extending axially substantially from an edge of the second working ply (22) to a point axially on the inside of the end of the first working ply (21) by a quantity of between 0.03 and 0.10 times the width L21, said wedge of rubber (6) permitting uncoupling of the edges of the working plies (21) and (22) wherein the tire has a height to maximum axial width (H/S) ratio of <0.60.

2. A tire according to claim 1, characterized in that the crown reinforcement (2) is completed by the presence, radially above the second, radially outermost, working ply (22), of a protective ply (23) of elastic cables oriented in the same direction as that of the cables of the subjacent second working ply (22), the protective ply (23) having an axial width L23 greater than the width L22 and less than the width L20, said protective ply (23) being separated from the cushion (5) by a wedge of rubber mix (7) of low modulus of extension, identical to the modulus of the layer of rubber mix (4) located between the at least one ply of circumferential cables (20) and the first, radially innermost, working ply (21).

* * * * *